United States Patent Office 3,198,745
Patented Aug. 3, 1965

3,198,745
PROCESS FOR BREAKING EMULSIONS OF THE OIL-IN-WATER CLASS
Louis T. Monson, La Puente, and Fred Wm. Jenkins, Buena Park, Calif., assignors to Petrolite Corporation, Brea, Calif., a corporation of Delaware
No Drawing. Filed Nov. 13, 1961, Ser. No. 152,074
16 Claims. (Cl. 252—344)

The present application is a continuation-in-part of our co-pending application, Serial No. 674,606, filed July 29, 1957, issued November 21, 1961, as U.S. Patent No. 3,009,884, which in turn is a continuation-in-part of application Serial No. 643,542, filed March 4, 1957, now U.S. Patent No. 2,914,484, issued November 24, 1959.

This invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: certain oil-refinery emulsions, in which a petroleum distillate occurs as a dispersion in water; steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing co-polymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrates the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from about 20% down to a few parts per million. Emulsions containing more than about 20% of dispersed phase are commonly of such stability as to be less responsive to the presently disclosed reagents, possibly because of the appreciable content of emulsifying agent present in such ssytems, whether intentionally incorporated for the purpose of stabilizing them, or not.

Although the present invention relates to emulsions containing as much as about 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures, in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to about 20% are herein included, as stated above.

The process which constitutes the present invention consists in subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Copending application Serial No. 674,606 is concerned with a process for breaking an emulsion comprising an oil dispersed in a non-oily continuous phase in which the dispersed phase is not greater than about 20% characterized by subjecting the emulsion to the action of a reagent which includes the ester of a polycarboxy acid and a high-molal water-dispersible, essentially non-ionic, basic-nitrogen-atom-containing surfactant which is an oxyalkylated derivative of an oxyalkylation-susceptible starting material and of an alkylene oxide having from 2 to 4 carbon atoms, selected from the class consisting of ethylene oxide, propylene oxide, butylene oxide, glycid, and methyl glycid, the molecular weight of the oxyalkylated derivative being within the range of about 1000 to about 10,000.

The reagents of the present application are included within the class of unesterified oxyalkylated surfactants disclosed, and, in the form of their polycarboxy acid esters, claimed in said co-pending application.

They are also related to certain of the compositions disclosed and claimed in co-pending application, Serial No. 674,599, also filed July 29, 1957, and also issued November 21, 1961, as Patent No. 3,009,883. In that second co-pending application, the claimed materials have in their molecules no radicals having as many as 8 carbon atoms in a single group. In the present application, in addition to containing a basic nitrogen atom, the reagents must have in the molecule at least one radical having as many as 8, but not more than 22, carbon atoms in a single group. In other words, there is present in the molecule a concentrated or localized hydrophobic influence.

The reagent employed as the demulsifier in any application of our present process includes a high-molal non-ionic surfactant, which surfactant is a water dispersible oxyalkylated derivative of an oxyalkylation-susceptible starting material. More particularly, our reagents may be referred to as "crypto-cationic," as explained below.

There are three principal types or classes of surfactants: anionic, cationic, and non-ionic. In the anionic class, the molecule bears an appreciable negative charge, sufficient to cause it to migrate to the anode when its solution is exposed to direct current. Similarly, cationic surfactants bear appreciable positive charges; and their molecules tend to migrate to the cathode when their solutions are exposed to direct current. Non-ionic surfactants do not possess appreciable electric charges of either sign. However, they have the properties of surfactants generally; they adsorb positively at interfaces; they lower the surface tension of water; they ordinarily produce some foaming when their dilute aqueous solutions are agitated, etc. The present reagents are non-ionic in character.

A crypto-cationic surfactant is one which, although it may possess structural characteristics or properties common to cationic compounds possesses them only in such small or submerged degree that they are not an obvious characteristic of the finished surfactant. For example, one may start with a basic amino compound, and introduce a large multiplicity of oxyalkylene groups by an oxyalkylation reaction, for example, by extensive oxyalkylation with ethylene oxide or propylene oxide or both. The finished product, because it includes a very large proportion of polyoxyalkylene groups, will be essentially non-ionic in character. Such amino-based surfactant is an example of our crypto-cationic non-ionic surfactants.

It should be noted that, unlike the foregoing example wherein the polar nature of the starting material is responsible for the designation of the finished surfactant as crypto-cationic, the polar group may be introduced intermediate the preparation of the finished surfactant from a non-ionic starting material; or it may be introduced after the oxyalkylation reaction has been completed.

For example, one may start with a non-ionic starting material; introduce an appreciable proportion of alkylene oxide residues; then introduce one or a few moles of an alkylene imine, such as ethylene imine; and then, if desired, continue the oxyalkylation. The finished high-molal surfactant, so prepared, acts as a non-ionic surfactant because the cationic properties incorporated therein by reaction with the imine are so small or so submerged as to be negligible. For example, one basic nitrogen atom will not confer noticeable cationic properties on an otherwise non-ionic compound having a molecular weight of the order of 1,000. Certainly it will not, when the molecular weight is, say 8,000–10,000.

The reagents employed by us in practising our process must be sufficiently water-dispersible under the conditions of use as to be miscible with the external phase of the emulsions which are to be resolved. All such emulsions are of the oil-in-water class; and hence they have water, some aqueous liquid, or at least some non-oily liquid as such external phase. Miscibility of the reagent with such phase, in the proportions required, is important if the reagent is to distribute itself throughout the emulsion in such manner as to resolve the latter.

Our reagents are all high-molal oxyalkylated derivatives of oxyalkylation-susceptible starting materials containing at least one labile hydrogen atom, that is, a hydrogen atom activated by the fact that it is attached to an atom of either oxygen, nitrogen or sulfur. Alcohols, carboxylic acids, phenols, amines, amides, mercaptans, are all examples of oxyalkylation-susceptible starting materials; and the products prepared from them by an oxyalkylation reaction are oxyalkylated derivatives of them.

Oxyalkylation is a well-known reaction. Ordinarily, it is achieved by reacting an oxyalkylation-susceptible starting material with an alkylene oxide like ethylene oxide, propylene oxide, butylene oxide, glycid, or methylglycid, or a carbonate of such an alkylene oxide. The free oxides are less expensive and more reactive than the carbonate forms, and hence are conventionally employed in the preparation of oxyalkylated derivatives of many oxyalkylation-susceptible starting materials. The oxyalkylation reaction using the alkylene oxides is a beautifully simple one to conduct, consisting merely in the introduction of the oxide into the starting material in presence of an alkaline catalyst (or, if the starting material is sufficiently basic, in absence of catalyst). Where large proportions of oxyalkylene radicals are to be so introduced into the starting material, a catalyst is ordinarily employed. In the oxyalkylation reaction, the oxyalkylene residue, or multiples thereof, is introduced into the starting material between the reactive or labile hydrogen atom and the adjoining oxygen, nitrogen or sulfur atom. The chain of oxyalkylene residues may be a very long one, including tens and even hundreds of recurrences of the bivalent alkylene oxide radical, —AlkO—.

The composition of such oxyalkylated derivatives is not so easily determined. Obviously, especially when the starting material includes more than one labile hydrogen atom, the reaction product is not a single compound of determinable and describable structure; it is a co-generic mixture of oxyalkylated derivatives containing alkylene oxide residue groups or chains of various sizes (that is, polyoxyalkylene radicals composed of different numbers of alkylene oxide residues). The composition of oxyalkylated derivatives is therefore to be described in terms of their process of manufacture, as above.

All of our reagents are described as "high-molal," in that they have theoretical molecular weights of from about 1,000 upward to about 10,000 or even greater. They are thereby distinguished from the large mass of surfactants. Simple soaps, the first widely-used and still the most widely-known class of surfactants, have molecular weights of the order of 300. Synthetic anionic detergents like keryl benzene sulfonates are surfactants; but their molecular weights are not greater than about 350–400. Dinonylnaphthalene sulfonates have molecular weights less than 500. Cationic surfactants like cetylpyridinium bromide and benzyltriethylammonium chloride have molecular weights less than about 400. In compounds of such lower molecular weights, the influence of a cationic element or group is signficant; but, as explained above, when it is suppressed or submerged in a high-molal oxyalkylation derivative of the present class, its influence becomes negligible.

Among the crypto-cationic reagents of the present class are the reagents produced according to the following representative examples. The examples are of course not intended to be exclusive.

*Example 1*

One mol (152 pounds) of crude octylamine (for example, Armour's "Armeen 8") is charged into an autoclave equipped for heating, stirring, and addition of reactants. At a temperature between 50° C. and 150° C., first propylene oxide, and then ethylene oxide are introduced slowly until 6 mols of propylene oxide (348 pounds) and 11.8 mols of ethylene oxide (524 pounds) have been added. After the pressure has decreased substantially to zero, heating is discontinued. The resulting material is liquid and water-dispersible. It is an effective oil-in-water demulsifier.

*Example 2*

One mol (267 pounds) of oleylamine (for example, Armour's "Armeen O") is charged into an autoclave equipped for heating, stirring, and addition of reactants. The oleylamine is heated to a temperature of from 50° C. to 150° C., and ethylene oxide is slowly introduced until 14 mols (616 pounds) have been added. After the pressure has decreased substantially to zero, heating is discontinued. The resulting material is liquid and water-dispersible. It is an effective oil-in-water demulsifier.

*Example 3*

Repeat Example 2 above, except use one mol (325 pounds) of behenylamine (for example, Archer-Daniels-Midland's "C–22") in place of oleylamine. The product is an effective oil-in-water demulsifier.

Other alkylamines, such as di-coco amine (Armour's "Armeen 2C"), di-hydrogenated tallow amine ("Armeen 2HT"), soya amine ("Armeen S"), palmitylamine, or arachidylamine, may be substituted, in equivalent amounts, for the amines used in Examples 1, 2, and 3 above.

*Example 4*

One mol (257 pounds) of a condensation product prepared from equimolar proportions of coconut oil fatty acid and 1,3-propylenediamine (for example, Armour's "Duomeen C" is charged into an autoclave as in Example 1 above, and reacted with 18 mols (792 pounds) of ethylene oxide, as there described. The product is an effective oil-in-water demulsifier.

Other fatty acids such as stearic, oleic, or the mixture of fatty acids obtained from tallow, may be substituted, in equivalent amounts, for coconut oil fatty acids in the above example.

*Example 5*

Two mols (564 pounds) of oleic acid and one mol (189 pounds) of tetraethylenepentamine are charged into an autoclave equipped for stirring, heating, and addition of reactants. The mass is heated with stirring to 200° C. and reacted until 2 mols (36 pounds) of water are removed. The resulting product is reduced in temperature to 150° C. and 10 mols (440 pounds) of ethylene oxide are added slowly, with stirring. The reaction is complete in about 2½ hours, the pressure dropping substantially to zero. The product is an effective oil-in-water demulsifier.

Other fatty acids, such a lauric, myristic, stearic, behenic, caprylic, and coco, may be substituted for oleic acid in the above example, in equivalent amounts.

Other polyalkylenepolyamines such as diethylenetriamine or triethylenetetramine or binary or ternary mixtures of diethylenetriamine, triethylenetetramine, and tetraethylenepentamine may be substituted in equivalent amounts for tetraethylenepentamine in the above example. The still bottoms from polyethylenepolyamine manufacture, which contain some of the foregoing three polyamines and also higher homologs thereof, may similarly be employed instead of tetraethylenepentamine in the above example.

*Example 6*

One mol (200 pounds) of lauric acid and one mol (189 pounds) of tetraethylenepentamine are charged into an autoclave equipped for stirring, heating, and addition of reactants. The mass is heated slowly to 275° C., yielding 1 mol (18 pounds) of water in the temperature range 180°–225° C. and an additional 1 mol of water at 275° C. The resulting product is cooled to 150° C., and five mols (290 pounds) of propylene oxide are added slowly, with stirring. After the pressure has dropped substantially to zero, signifying completion of the reaction, 8 mols (352 pounds) of ethylene oxide are introduced into the reaction mass. The product is an effective oil-in-water demulsifier.

Other fatty acids, such as stearic, oleic, myristic, caprylic, behenic, and coco, may be substituted for lauric acid in the above example, in equivalent amounts.

Example 7

To 279 pounds of dehydroabietylamine (known commercially as "Rosin Amine D") in a previously-purged autoclave are added 250 pounds of propylene oxide, at a temperature of 125°–130° C. and a maximum pressure of about 20 p.s.i.g. Then, 10 pounds of NaOH are added, as a 50% aqueous solution. The water of solution is distilled, the autoclave is again sealed, and 330 pounds of propylene oxide are similarly reacted, using the same operating conditions. Thereafter, without removing the product from the autoclave, 176 pounds of ethylene oxide are similarly reacted, using the same operating conditions. The product is an effective oil-in-water demulsifier.

Example 8

Example 7 above is repeated; but instead of using both propylene oxide and ethylene oxide, in the presence of a catalyst, 704 pounds of ethylene oxide are reacted in absence of the NaOH catalyst. The product is an effective oil-in-water demulsifier.

In some of the foregoing examples, the reactant weights shown do not agree with theoretical molecular weights. This is explainable on the basis that the materials used were not pure; and the weights employed were therefore essentially equivalent weights. Where the weight shown for any reactant does not agree with the theoretical molecular weight for that reactant, the weight shown rather than the molar proportion shown is controlling.

Our demulsifier may be applied in concentrated form, or it may be diluted with a suitable solvent. Water has frequently been found to constitute a satisfactory solvent, because of its ready availability and negligible cost; but in other cases non-aqueous solvents, such as aromatic petroleum solvent, have been employed in preparing reagents which are effective when used for the purpose of resolving oil-in-water emulsions. Because such reagents are frequently effective in proportions of the order of 10 to 50 parts per million, their solubility in the emulsion mixture may be entirely different from their apparent solubility in bulk, in water or oil. Undoubtedly, they have some solubility in both media, within the concentration range employed.

It should be pointed out that the superiority of the reagent contemplated in the present process is based upon its ability to separate the oil phase from certain oil-in-water class emulsions more advantageously and at lower cost than is possible with other reagents or other processes. In some cases, it is capable of resolving emulsions which are not economically or effectively resolvable by any other known means.

While heat is often of little value in improving results when the present process is practised, still there are instances where the application of heat is distinctly of benefit. In some instances, adjustment of the pH of the emulsion, to an experimentally determinable optimum value, will materially improve the results obtained in applying the present process.

In operating the present process to resolve an oil-in-water emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion is standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the emulsion to be resolved, frequently has a favorable influence of totally unexpected magnitude. By incorporating the step of subjecting the chemicalized emulsion to the action of air in a sub-aeration type flotation cell, a clear aqueous layer is sometimes obtained in a matter of seconds, without added quiescent settling, and with approximately as much reagent. Natural gas was found to be as good a gaseous medium as was air, in this operation.

It should be distinctly understood that such aeration technique, while an important adjunct to the use of the present reagent, in some cases, is not an equivalent procedure. This may be proved by subjecting an un-chemicalized emulsion to aeration for a period of minutes without detectable favorable effect. Addition of the reagent to such aerated emulsion will produce resolution, promptly.

The details of the mechanical structures required to produce aeration suitable for the present purpose need not be given here. It is sufficient to state that any means capable of producing small gas bubbles within the body of the emulsion is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

The principle of aeration has been applied to the resolution of emulsions by Broadbridge, in U.S. Patent No. 1,505,944, and Bailey, in U.S. Patent No. 1,770,476. Neither of these patents discloses or suggests the present invention, as may be seen from an inspection of their contents.

Suitable aeration is sometimes obtainable by use of the principle of Elmore, U.S. Patent No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Dorr "Vacuator."

The manner of practicing the present invention using aeration is clear from the foregoing description.

The order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. Other commonly suitable gases include natural gas, nitrogen, carbon dioxide, oxygen, etc., the gas being used essentially for its levitation effect. If any gas has some deleterious effect on any component of the emulsion, it will obviously be desirable to use instead some other gas which is inert under the conditions of use.

In summary of the foregoing: We employ as demulsifiers for oil-in-water emulsions high-molal cryptocationic surfactants which are oxyalkylated derivatives of oxyalkylation-susceptible starting materials, the surfactants being essentially non-ionic and including in the molecule at least one basic nitrogen atom and at least one radical having from 8 to 22 carbon atoms in a single group, the molecular weight of the reagents being within the range of about 1000 to about 10,000.

Our reagents may be employed alone, or they may in some instances be advantageously employed admixed with other and compatible oil-in-water demulsifiers. Specifically, we may employ them to advantage with the reagents described in U.S. Patent No. 2,470,829, dated May 24, 1949, to Monson.

Our process is commonly practised simply by introducing small proportions of our reagent into an oil-in-water class emulsion, agitating the secure distribution of the reagent and incipient coalescence, and letting the mixture stand until the oil phase separates. The proportion of reagent required will vary with the character of the emulsion to be resolved. Ordinarily, proportions of reagent required are from about $1/10,000$ to about $1/4,000,000$ the volume of emulsion treated; but more or less may be required.

A preferred method of practising the process to resolve a petroleum oil-in-water emulsion is as follows: Flow the oil well fluids, consisting of free oil, oil-in-water emulsion, and natural gas, through a conventional gas separator, then to a conventional steel oil-field tank, of, for example, 5,000-bbl. capacity. In this tank the oil-in-water emulsion falls to the bottom, is withdrawn, and is so separated from the free oil. The oil-in-water emulsion, so withdrawn, is subjected to the action of our reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the preivously emulsified oil separates, rises to the surface, and is removed. The separated water, containing relatively little to substantially none of the previously emulsified oil, is thereafter discarded.

The following will illustrate the operating steps employed to resolve an emulsion of the oil-in-water class by use of a reagent of the present kind.

A natural crude petroleum oil-in-water emulsion is subjected to the action of the product of Example 1 above. The mixture of emulsion and demulsifier is agitated for 2 minutes at 130 shakes per minute, and then allowed to stand quiescent. Separation is nearly complete after 18 hours. A check- or control-sample of the same emulsion, processed the same way except that no reagent is added to it, is still brown-colored at the end of this period, whereas the treated sample is clear.

Throughout the foregoing description, we have referred to "oil" and to "water." By "oil" we mean an oily, non-aqueous liquid which is not soluble in or miscible with water. By "water" we mean water, aqueous solutions, and any non-oily liquid which is not soluble in or miscible with oils.

We claim:

1. A process for breaking an emulsion comprising an oil dispersed in a non-oily continuous phase, in which the dispersed phase is not greater than about 20%, characterized by subjecting the emulsion to the action of a reagent which includes a high-molal water-dispersible, essentially non-ionic, basic-nitrogen-atom-containing surfactant which is an oxyalkylated derivative of (A) an oxyalkylation-susceptible starting material composed only of carbon, oxygen, hydrogen and nitrogen atoms and selected from the class consisting of an alkylamine containing 8 to 22 carbon atoms, a substituted polyalkylene polyamine wherein the substituent is derived from a fatty acid containing 8 to 22 carbon atoms, and a rosin-derived amine, and of (B) an alkylene oxide having from 2 to 4 carbon atoms selected from the class consisting of ethylene oxide, propylene oxide, butylene oxide, glycid and methylglycid, the molecular weight of the oxyalkylated derivative being within the range of about 1,000 to about 10,000.

2. The process of claim 1, in which the emulsion is a petroleum oil-in-water emulsion.

3. The process of claim 2, wherein the starting material used to produce the reagent is an alkylamine containing from 8 to 22 carbon atoms.

4. The process of claim 3, wherein the starting material used to produce the reagent is a primary alkylamine containing from 8 to 22 carbon atoms.

5. The process of claim 2, wherein the starting material used to produce the reagent is a substituted polyalkylene-polyamine, the substituent being derived from a fatty acid containing from 8 to 22 carbon atoms.

6. The process of claim 5, wherein the starting material used to produce the reagent is a substituted polyethylene-polyamine, the substituent being derived from a fatty acid containing from 8 to 22 carbon atoms.

7. The process of claim 2, wherein the starting material used to produce the reagent is a rosin-derived amine.

8. The process of claim 2, wherein the oxyalkylated derivative is both polyoxyethylated and polyoxypropylated.

9. A process for breaking an emulsion comprising an oil dispersed in a non-oily continuous phase, in which the dispersed phase is not greater than about 20%, characterized by subjecting the emulsion to aeration and to the action of a reagent which includes a high-molal water dispersible, essentially non-ionic, basic-nitrogen-atom-containing surfactant which is an oxyalkylated derivative of (A) an oxyalkylation-susceptible starting material composed only of carbon, oxygen, hydrogen and nitrogen atoms and selected from the class consisting of an alkylamine containing 8 to 22 carbon atoms, a substituted polyalkylene polyamine wherein the substituent is derived from a fatty acid containing 8 to 22 carbon atoms, and a rosin-derived amine, and of (B) an alkylene oxide having from 2 to 4 carbon atoms selected from the class consisting of ethylene oxide, propylene oxide, butylene oxide, glycid and methylglycid, the molecular weight of the oxyalkylated derivative being within the range of about 1,000 to about 10,000.

10. The process of claim 9, in which the emulsion is a petroleum oil-in-water emulsion.

11. The process of claim 10 wherein the starting material used to produce the reagent is an alkylamine containing from 8 to 22 carbon atoms.

12. The process of claim 11, wherein the starting material used to produce the reagent is a primary alkylamine containing from 8 to 22 carbon atoms.

13. The process of claim 10, wherein the starting material used to produce the reagent is a substituted polyalkylene polyamine, the substituent being derived from a fatty acid containing from 8 to 22 carbon atoms.

14. The process of claim 13, wherein the starting material used to produce the reagent is a substituted polyethylene polyamine, the substituent being derived from a fatty acid containing from 8 to 22 carbon atoms.

15. The process of claim 10, wherein the starting material used to produce the reagent is a rosin-derived amine.

16. The process of claim 10, wherein the oxyalkylated derivative is both polyoxyethylated and polyoxypropylated.

References Cited by the Examiner
UNITED STATES PATENTS

| | | | |
|---|---|---|---|
| 1,505,944 | 8/24 | Broadbridge et al. | 252—326 |
| 2,514,399 | 7/50 | Kirkpatrick et al. | 252—340 |
| 2,759,607 | 8/56 | Boyd et al. | 252—340 |
| 2,914,484 | 11/59 | Monson et al. | 252—340 |
| 3,009,884 | 11/61 | Monson et al. | 252—341 |
| 3,060,210 | 10/62 | De Groote et al. | 252—8.5 |

JULIUS GREENWALD, *Primary Examiner.*